US012256235B2

(12) United States Patent
Abedini et al.

(10) Patent No.: US 12,256,235 B2
(45) Date of Patent: Mar. 18, 2025

(54) FREQUENCY DOMAIN BEAM SWEEP BY ASSISTING NODES

(71) Applicant: QUALCOMM Incorporated, San Diego, CA (US)

(72) Inventors: Navid Abedini, Basking Ridge, NJ (US); Junyi Li, Fairless Hills, PA (US); Juergen Cezanne, Ocean Township, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/395,192

(22) Filed: Aug. 5, 2021

(65) Prior Publication Data
US 2023/0044082 A1    Feb. 9, 2023

(51) Int. Cl.
*H04W 16/28*    (2009.01)
*H04B 7/04*     (2017.01)
*H04B 7/155*    (2006.01)

(52) U.S. Cl.
CPC ............ *H04W 16/28* (2013.01); *H04B 7/155* (2013.01)

(58) Field of Classification Search
CPC ... H04W 16/28; H04B 7/155; H04B 7/04013; H04B 7/15528
See application file for complete search history.

(56) References Cited

U.S. PATENT DOCUMENTS

| 2009/0060065 A1* | 3/2009 | Walker ............... H04B 7/18523 |
| | | 455/12.1 |
| 2012/0027054 A1* | 2/2012 | Palanki ............... H04B 7/0857 |
| | | 375/211 |
| 2018/0019811 A1* | 1/2018 | Buer ....................... H01Q 1/06 |

(Continued)

FOREIGN PATENT DOCUMENTS

| CN | 207249103 U | | 4/2018 | |
| WO | WO 2021104680 | * | 6/2021 | ............ H04W 88/04 |

OTHER PUBLICATIONS

International Search Report and Written Opinion—PCT/US2022/039054—ISA/EPO—Oct. 28, 2022.

(Continued)

*Primary Examiner* — Harry H Kim
(74) *Attorney, Agent, or Firm* — Seyfarth Shaw LLP (57) ABSTRACT

An assisting network device receives an incoming signal from a transmitting device. The assisting network device forwards the incoming signal to a receiving device in a beam direction based on a frequency of the incoming signal. A method of wireless communication by a first wireless device includes determining an indication of a frequency domain beam sweeping configuration of an assisting network device. The method communicates a signal with a second wireless device via the assisting network device in a beam direction based on a frequency of the signal. A method of wireless communication by a controlling entity determines a frequency domain beam sweeping configuration of an assisting network device. The method indicates the frequency domain beam sweeping configuration to a first wireless device, via the assisting network device, for communication with a second wireless device in a beam direction based on a frequency of an incoming signal.

29 Claims, 7 Drawing Sheets

(56) References Cited

U.S. PATENT DOCUMENTS

| | | | |
|---|---|---|---|
| 2018/0035396 A1* | 2/2018 | Stirling-Gallacher | ........................ H04W 56/0005 |
| 2018/0054276 A1* | 2/2018 | Islam | ..................... H04L 5/0048 |
| 2018/0249461 A1* | 8/2018 | Miao | ..................... H04W 72/27 |
| 2019/0059056 A1 | 2/2019 | Islam et al. | |
| 2019/0238270 A1* | 8/2019 | Pan | ................... H04W 74/0833 |
| 2019/0380056 A1 | 12/2019 | Lee et al. | |
| 2020/0051942 A1* | 2/2020 | Nakazawa | ............. H04B 1/006 |
| 2020/0350980 A1* | 11/2020 | Rofougaran | .......... H04W 16/28 |
| 2020/0374873 A1* | 11/2020 | Tiirola | .................. H04W 72/23 |
| 2020/0403689 A1 | 12/2020 | Rofougaran et al. | |
| 2021/0159927 A1* | 5/2021 | Mori | ..................... H04B 1/0067 |
| 2021/0314796 A1* | 10/2021 | Hoang | .................. H04W 24/08 |
| 2022/0014935 A1* | 1/2022 | Haija | ..................... H04L 5/0048 |
| 2022/0174509 A1* | 6/2022 | Noh | ................... H04B 7/15528 |
| 2022/0200690 A1* | 6/2022 | Jacob | ..................... H04B 7/024 |
| 2022/0286867 A1* | 9/2022 | Siomina | ................ H04W 16/28 |

OTHER PUBLICATIONS

Yuan J., et al., "Frequency-Mixing Intelligent Reflecting Surfaces for Nonlinear Wireless Propagation", IEEE Wireless Communications Letters, IEEE, Piscataway, NJ, USA, vol. 10, No. 8, Aug. 2021, pp. 1672-1676.

* cited by examiner

FREQUENCY DOMAIN BEAM SWEEP BY ASSISTING NODES

FIELD OF THE DISCLOSURE

The present disclosure relates generally to wireless communications, and more specifically to frequency domain beam sweeping by assisting nodes.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by an assisting network device includes receiving an incoming signal from a transmitting device. The method also includes forwarding the incoming signal to a receiving device in a beam direction based on a frequency of the incoming signal.

In other aspects of the present disclosure, a method of wireless communication by a first wireless device includes determining an indication of a frequency domain beam sweeping configuration of an assisting network device. The method also includes communicating a signal with a second wireless device via the assisting network device in a beam direction based on a frequency of the signal.

In other aspects of the present disclosure, a method of wireless communication by a controlling entity includes determining a frequency domain beam sweeping configuration of an assisting network device. The method also includes indicating the frequency domain beam sweeping configuration to a first wireless device, via the assisting network device, for communication with a second wireless device in a beam direction based on a frequency of an incoming signal.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Assisting nodes, such as repeaters and/or reflectors, can be deployed in a wireless communication system. The assisting nodes may extend coverage of other network nodes (e.g., base stations) and/or provide spatial diversity. As a result, the network may have an increased reliability and/or capacity. Different types of assisting nodes include repeaters, lower layer relays, and reflectors. The lower layer relays may include wireless remote units (RUs) and transmit and receive points (TRPs). An example of a reflector is an intelligent reflecting surface (IRS).

In general, there are two types of assisting nodes. The first type is a non-configurable assisting node, with a fixed or semi-fixed configuration. The second type is a smart assisting node, which has dynamically configurable properties. Smart assisting nodes may further be divided into two sub-types. The first sub-type is "autonomously smart," where the node may learn and reconfigure its properties as needed. The second sub-type is "network-controlled smart," where the node may be controlled remotely by a control node or controlling entity. A control interface exists between the assisting node and the control node.

The configuration of repeaters includes power settings, transmit and receive (TX/RX) beams, and/or the uplink/downlink (UL/DL) forwarding direction of the repeaters. The configuration for reflectors may include information such as reflecting coefficients, directions, and/or reflecting patterns.

According to aspects of the present disclosure, a reflecting surface has a reflection pattern that depends on frequency. For example, at frequency F, a main lobe points to direction D(F) (e.g., the reflected signal has the highest power in that direction), where D( ) represents azimuth and elevation. In other words, at any given observing direction, a different frequency-selective channel would be observed. The focus distance of the reflected signal may also depend on the frequency.

A reflecting surface may effectively reflect an incoming wideband signal into different directions. Different subbands of the signal may have different main reflected directions. Similarly, the reflection pattern can be such that the incoming signal from different directions would be reflected in a frequency-dependent fashion. For example, a reflector may best reflect a signal in subband one arriving from direction one and a signal in subband two arriving from direction two. The reflector frequency division multiplexes the signal. In some aspects, signals arrive from different directions and are forwarded in a single direction. In other aspects, signals arrive from one direction and are forwarded in multiple different directions.

In aspects of the present disclosure, a repeater may employ a true time delay analog array, leaky wave antenna, or some other technique to implement frequency domain beam sweeping. For example, at frequency F, the main lobe points to direction D(F). In other words, at any given observing direction, a different frequency-selective channel may be observed. Such repeaters may be used to effectively send and receive frequency division multiplexed signals in different directions.

In aspects of the present disclosure, the assisting node has fixed or non-configurable properties. These properties may be indicated to a network node that would utilize the assisting node for its communication. Such indication may come directly from the assisting node if the assisting node can communicate with the network node. Alternatively, the indication may originate from a third entity, such as another network node or control entity. In this case, the third entity may or may not be in communication with the assisting node. The third entity may be another network node or control entity, such as a server accessible via an Internet protocol (IP) network.

In other aspects of the present disclosure, the property may be configurable. In these aspects, a network node or a control entity may provide an indication to the assisting node to change its configuration. The indication may request a change either dynamically or semi-statically.

In still other aspects, the property is fixed and not indicated. In these aspects, the network node or other control entity (or a device that will use the assisting node) may attempt to detect or learn the configuration (e.g., property). The detecting or learning may occur with various channel measurements or beam measurements and reports by network node(s), as well as from side information such as the location of the measuring nodes. For example, a base station may send a signal at different angles and receive UE measurement reports to help detect the configuration. The acquired information or property may be shared among different nodes or entities.

Figure 1:
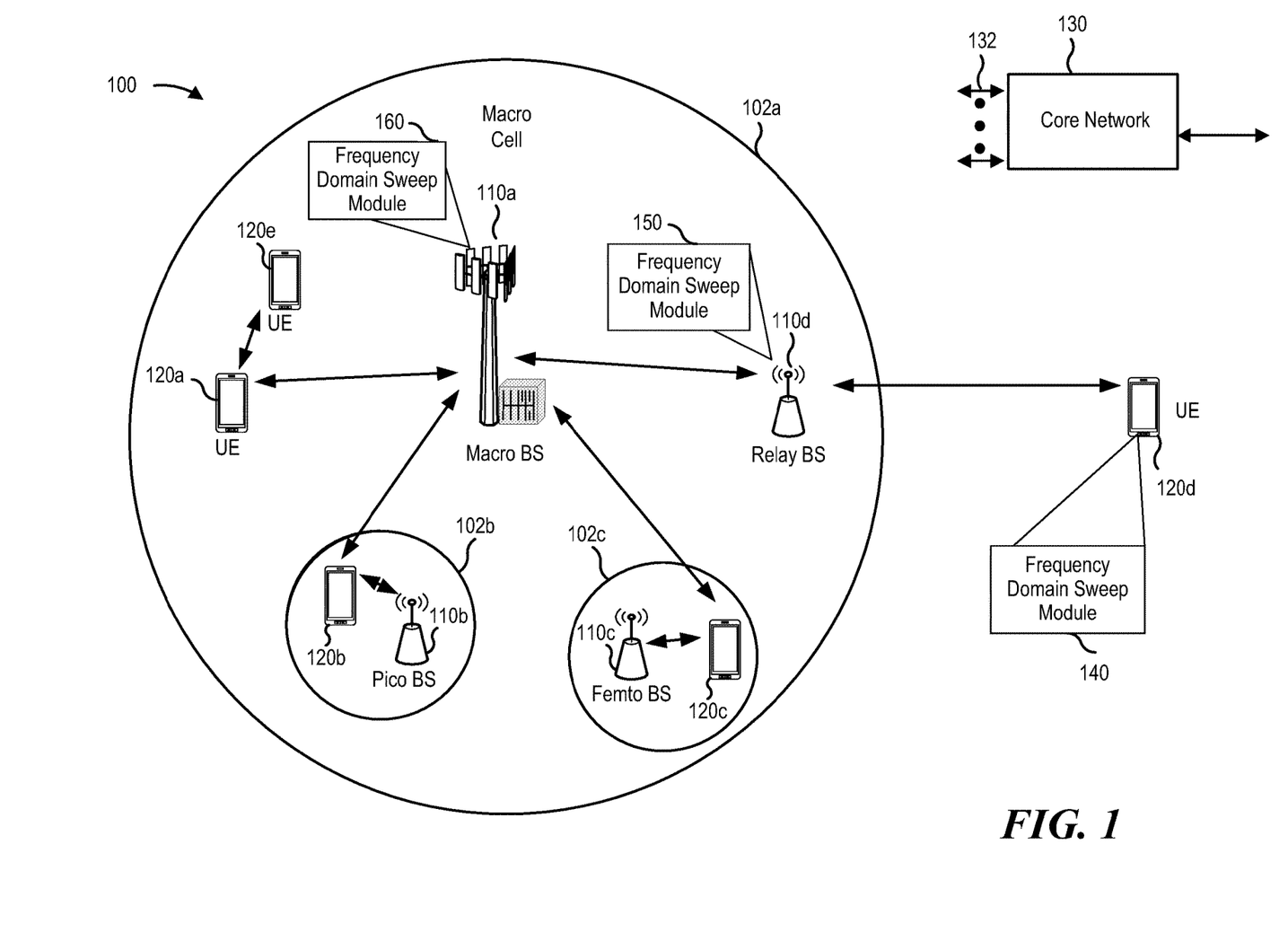
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications network 100, while also satisfying performance specifications of individual applications of the UE 120. In some cases, the network slices used by UE 120 may be served by an access and mobility management function (AMF) (not shown in FIG. 1) associated with one or both of the base station 110 or core network 130. In addition, session management of the network slices may be performed by an AMF.

The UEs 120 and/or base station 110 may include a frequency domain sweep module 140. For brevity, only one UE 120d is shown as including the frequency domain sweep module 140. The frequency domain sweep module 140 may determine an indication of a frequency domain beam sweeping configuration of an assisting network device. The frequency domain sweep module 140 may also communicate a signal with a second wireless device via the assisting network device in a beam direction based on a frequency of the signal.

The assisting device 110*d* or the base stations 110 may include a frequency domain sweep module 150 for receiving an incoming signal from a transmitting device. The frequency domain sweep module 150 may also forward the incoming signal to a receiving device in a beam direction based on a frequency of the incoming signal.

The base stations 110 or some type of controlling entity may include a frequency domain sweep module 160 for determining a frequency domain beam sweeping configuration of an assisting network device. The frequency domain sweep module 160 may also indicate the frequency domain beam sweeping configuration to a first wireless device, via the assisting network device, for communication with a second wireless device in a beam direction based on a frequency of an incoming signal.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as narrowband internet of things (NB-IoT) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
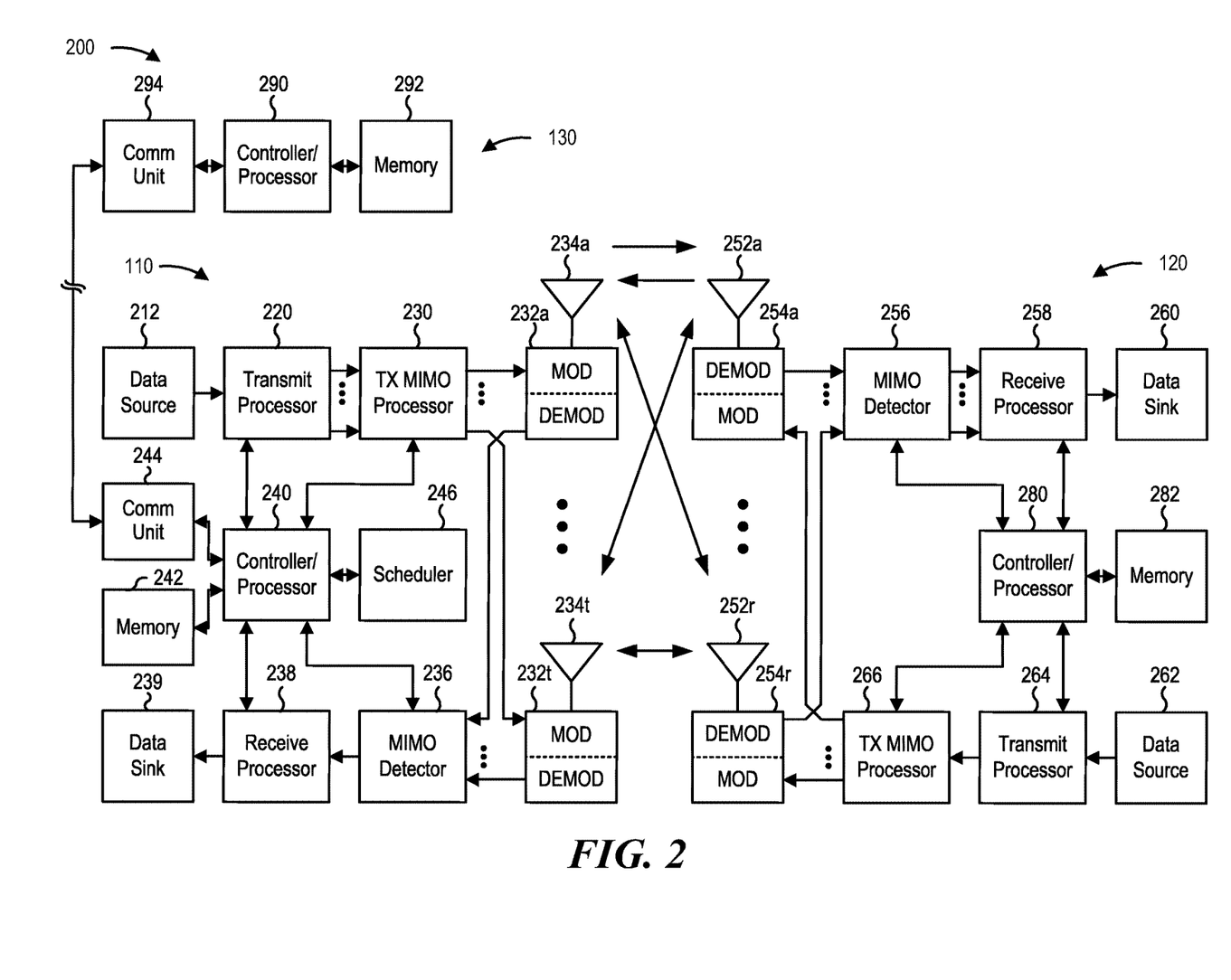
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/ processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with frequency domain beam sweeping as described in more detail elsewhere. For example, the controller/processor 240 of the base station 110, the controller/processor 280 of the UE 120, and/or any other component(s) of FIG. 2 may perform or direct operations of, for example, the process of FIGS. 5-7 and/or other processes as described. Memories 242 and 282 may store data and program codes for the base station 110 and UE 120, respectively. A scheduler 246 may schedule UEs for data transmission on the downlink and/or uplink.

In some aspects, the UE 120, the core network 130, and/or the base station 110 may include means for receiving, means for forwarding, means for determining, means for indicating, means for communicating, means for detecting, means for sharing, and means for configuring. Such means may include one or more components of the base station 110, core network 130, and/or UE 120 described in connection with FIG. 2.

As indicated above, FIG. 2 is provided merely as an example. Other examples may differ from what is described with regard to FIG. 2.

Assisting nodes, such as repeaters and/or reflectors, can be deployed in a wireless communication system. The assisting nodes may extend coverage of other network nodes (e.g., base stations) and/or provide spatial diversity. As a result, the network may have an increased reliability and/or capacity. Different types of assisting nodes include repeaters, lower layer relays, and reflectors. The lower layer relays may include wireless remote units (RUs) and transmit and receive points (TRPs). An example of a reflector is an intelligent reflecting surface (IRS).

In general, there are two types of assisting nodes. The first type is a non-configurable assisting node, with a fixed or semi-fixed configuration. The second type is a smart assisting node, which has dynamically configurable properties. Smart assisting nodes may further be divided into two sub-types. The first sub-type is "autonomously smart," where the node may learn and reconfigure its properties as needed. The second sub-type is "network-controlled smart," where the node may be controlled remotely by a control node or controlling entity. A control interface exists between the assisting node and the control node.

The configuration of repeaters includes power settings, transmit and receive (TX/RX) beams, and/or the uplink/downlink (UL/DL) forwarding direction of the repeaters. The configuration for reflectors may include information such as reflecting coefficients, directions, and/or reflecting patterns.

Figure 3:
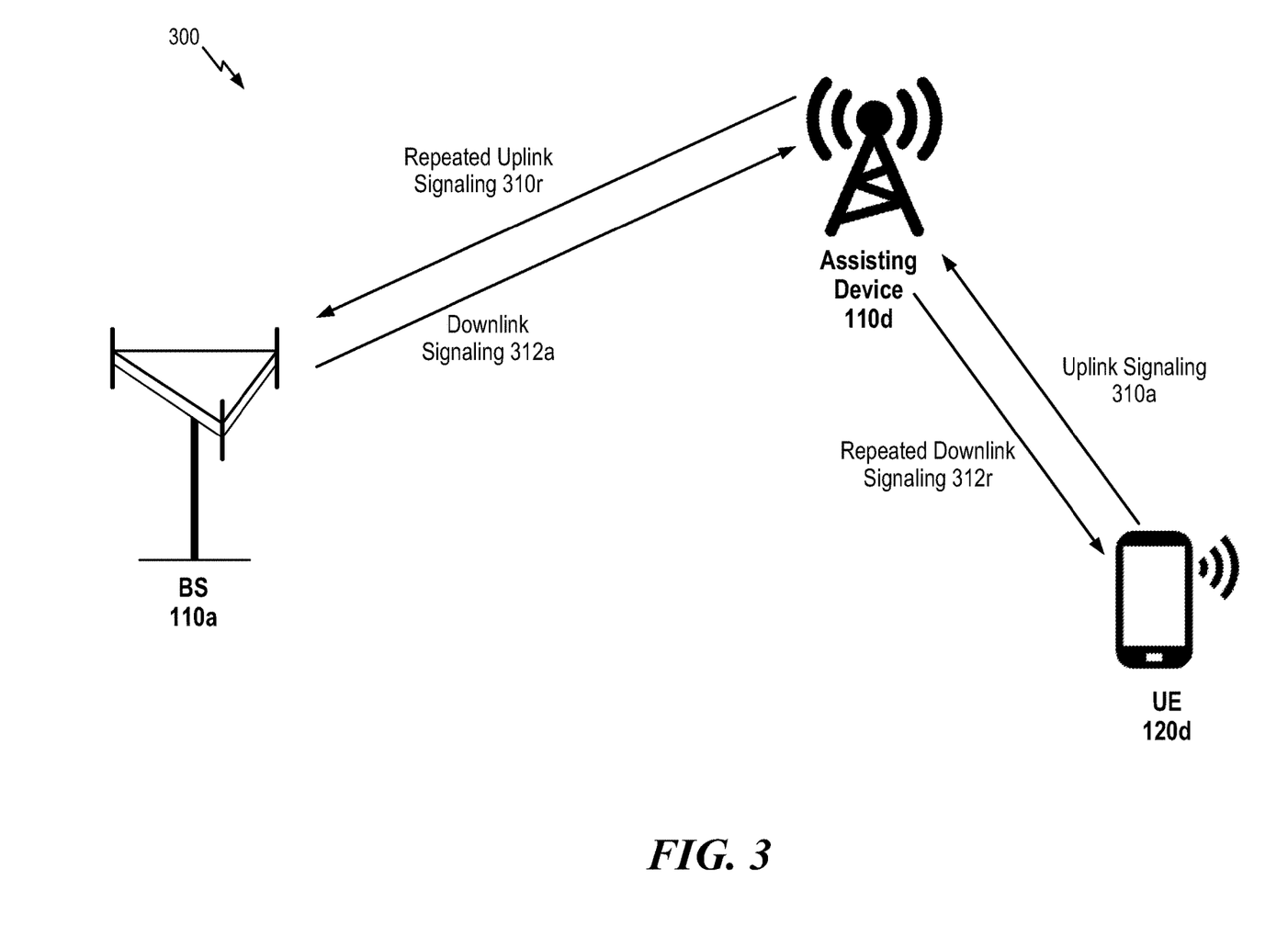
FIG. 3 is a diagram conceptually illustrating an assisting device performing frequency domain beam sweeping in a wireless communications network, in accordance with various aspects of the present disclosure.

FIG. 3 is a diagram conceptually illustrating an assisting device 110d (e.g., the relay base station 110d of FIG. 1) performing frequency domain beam sweeping in a wireless communications network 300, in accordance with certain aspects of the present disclosure. In this example, the wireless communications network 300 includes a UE 120d and a base station 110a engaged in wireless communication with each other through the assisting device 110d. For example, the UE 120d may communicate via uplink signaling 310a to the assisting device 110d, which the assisting device 110d may relay to the base station 110a via repeated uplink signaling 310r. Similarly, the base station 110a may communicate via downlink signaling 312a to the assisting device 110d, which the assisting device 110d may then relay to the UE 120d via repeated downlink signaling 312r. In this case, the uplink signaling 310a is configured to provide data or control information to the base station 110a, and the downlink signaling 312a is configured to provide data or control information to the UE 120d.

The assisting device 110d may utilize spatially directed beams to communicate the repeated downlink signaling 312r to the UE 120d and the repeated uplink signaling 310r to the base station 110a. The beam direction may be based on a frequency of an incoming signal, for example, the downlink signaling 312a or the uplink signaling 310a. In one example, the assisting device 110d may receive uplink signaling 310a from the UE 120d, and determine a beam direction for retransmitting the uplink signaling 310a to the base station 110a. In certain aspects, the beam direction for retransmission is determined based on a frequency of the incoming signal.

In a typical analog beamforming array, a signal is transmitted from array elements with different beamforming weights ($w_i$). In the absence of frequency selectivity of the wireless channel, the received signal at the UE is flat in frequency. Beam sweeping in the frequency domain enables the UE to receive the signal in different frequencies. A leaky wave antenna or a true time delay analog array may implement beam sweeping. With leaky wave antennas, different subbands leak from the antenna in different directions, enabling the frequency domain beam sweeping. A true time delay analog array architecture adds different time delays to beamforming weights ($w_i$) such that beamforming is frequency selective in different directions.

Figure 4:
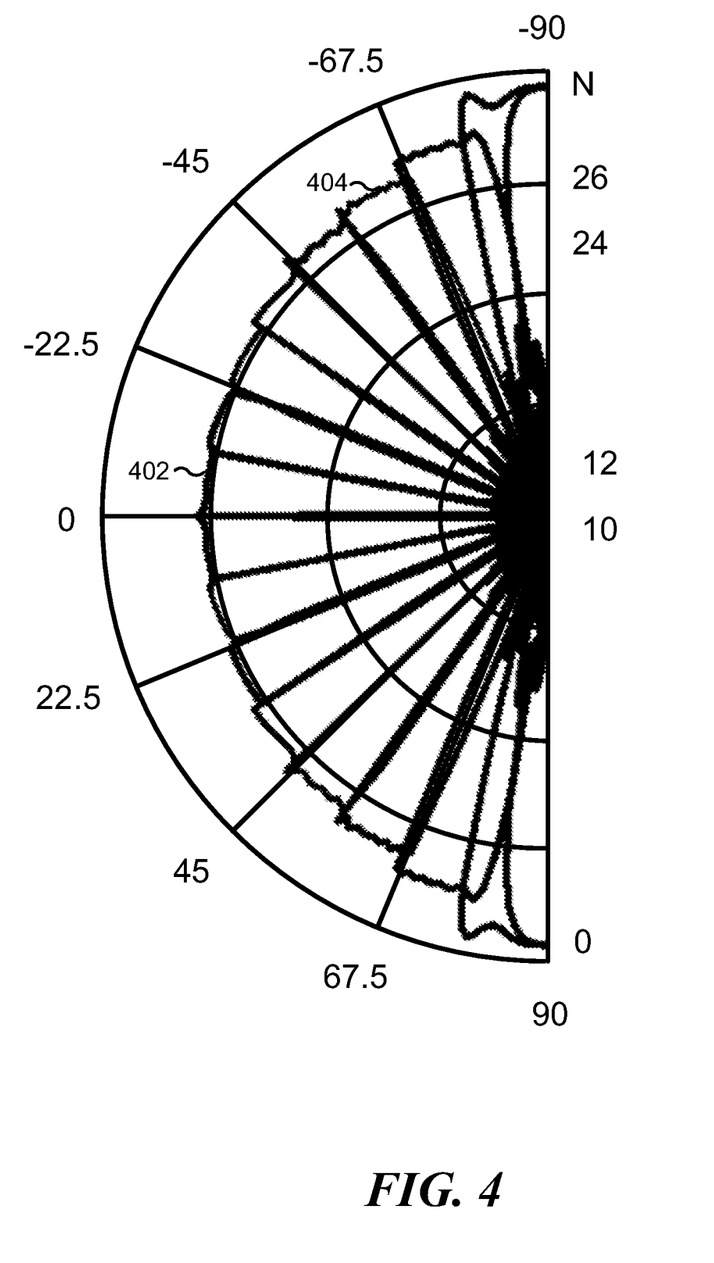
FIG. 4 is a block diagram illustrating true time delay beam steering.

FIG. 4 is a block diagram illustrating true time delay beam steering. In FIG. 4, an angle of departure or arrival ranges from −90 degrees to +90 degrees. A wideband signal has indexes of resource elements, resource blocks, or tones ranging from 0 to N, where 0 is the lowest frequency and N is the highest frequency. As seen in FIG. 4, the signal of one fraction of a frequency is pointing at one direction and that of another fraction is pointing at a different direction. For example, a curve 402 represents a beam is roughly in the range of 0 degrees to −10 degrees. Drawing horizontal lines from the extreme points of the curve 402 representing the beam, results in intersections with indexes 10 and 12 on the Y axis. Thus, the frequency components in this range (10 to 12) are received with the highest power in the corresponding range of angles (0, −10). If another device is located at −50 degrees (designated with reference 404), which is outside the (0, −10) range, the other device cannot effectively communicate signals with frequency components in the 10 to 12 range. In other words, the frequency components in this range will be very weak for the receiver at the −50 degree relative angle. On the other hand, for a specific device at −50 degrees, the frequency components around indexes 24 and 26 will be received with the best quality and highest energy.

According to aspects of the present disclosure, a reflecting surface has a reflection pattern that depends on frequency. For example, at frequency F, a main lobe points to direction D(F) (e.g., the reflected signal has the highest power in that direction), where D( ) represents azimuth and elevation. In other words, at any given observing direction, a different frequency-selective channel would be observed. The focus distance of the reflected signal may also depend on the frequency.

A reflecting surface may effectively reflect an incoming wideband signal into different directions. Different subbands of the signal may have different main reflected directions. Similarly, the reflection pattern can be such that the incoming signal from different directions would be reflected in a frequency-dependent fashion. For example, a reflector may best reflect a signal in subband one arriving from direction one and a signal in subband two arriving from direction two. The reflector frequency division multiplexes the signal. In some aspects, signals arrive from different directions and are forwarded in a single direction. In other aspects, signals arrive from one direction and are forwarded in multiple different directions.

In aspects of the present disclosure, a repeater may employ a true time delay analog array, leaky wave antenna, or some other technique to implement frequency domain beam sweeping. For example, at frequency F, the main lobe points to direction D(F). In other words, at any given observing direction, a different frequency-selective channel may be observed. Such repeaters may be used to effectively send and receive frequency division multiplexed signals in different directions.

An assisting node may have M directions to sweep. In this case, a base station simultaneously transmits M copies of a signal, such as a synchronization signal block (SSB), in different frequency subbands, all pointing towards the repeater. The repeater repeats the signal via true time delay array sweeping towards M different directions. The base station may transmit one copy of the SSB towards the repeater. The repeater downconverts the signal from radio frequency (RF) to baseband (BB), eliminates anything outside the BB SSB via analog filtering, duplicates the BB SSB to M subbands, upconverts the resultant signal from BB to RF, and transmits it via true time delay array sweeping towards M different directions.

According to aspects of the present disclosure, a property (or configuration) of the assisting node may be used for beam sweeping in the frequency domain. For example, the beam sweeping may broadcast a signal in multiple directions, where the incoming wideband signal comprises multiple copies of a base signal in frequency domain and multiple copies reflect in multiple directions. As an example, the base signal may be a synchronization signal block (SSB) or channel state information-reference signal (CSI-RS). The property may also be used to receive two frequency division multiplexed signals from two directions (two transmission points or UEs) and forward or reflect the combined signal to a single receive point.

The property may also be used to receive two frequency division multiplexed signals from a single transmission point (for example, frequency division multiplexed physical uplink control channel (PUCCH) or physical uplink shared channel (PUSCHs)) and forward or reflect each signal to a specific direction or receive point. The property may also be used to receive two frequency division multiplexed signals from two directions (two transmission points or TRPs or UEs, or two beams or clusters of the same transmission point). The assisting node may forward or reflect each signal to a specific direction or receive point, TRP, or UE. For example, the assisting node may forward signals between TRP1/gNB1 and UE1 and TRP2/gNB2 and UE2. In some aspects, the assisting node property may be used for beam refinement, angle of arrival (AoA) and/or angle of departure (AoD) estimation, and positioning.

In aspects of the present disclosure, the assisting node has fixed or non-configurable properties. These properties may be indicated to a network node that would utilize the assisting node for its communication. Such indication may come directly from the assisting node if the assisting node can communicate with the network node. Alternatively, the indication may originate from a third entity, such as another network node or control entity. In this case, the third entity may or may not be in communication with the assisting node. The third entity may be another network node or control entity, such as a server accessible via an Internet protocol (IP) network.

In other aspects of the present disclosure, the property may be configurable. In these aspects, a network node or a control entity may provide an indication to the assisting node to change its configuration. The indication may request a change either dynamically or semi-statically.

In still other aspects, the property is fixed and not indicated. In these aspects, the network node or other control entity (or whatever device will use the assisting node) may attempt to detect or learn the configuration (e.g., property). The detecting or learning may occur with various channel measurements or beam measurements and reports by network node(s), as well as from side information such as the location of the measuring nodes. For example, a base station may send a signal at different angles and receive UE measurement reports to help detect the configuration. The acquired information or property may be shared among different nodes or entities.

The term "property" may refer to the reflecting pattern of a reflector or the frequency domain transmit or receive beam pattern of a repeater. The pattern may have a range of directions and distances, and a relationship to the relevant frequency domain resources. The pattern may have relevant frequency domain resources (e.g., subbands) for a given or indicated direction. The pattern may also include the relevant direction of a given or indicated subbands, as well as a range of values that can be configured.

As indicated above, FIGS. 3-4 are provided as examples. Other examples may differ from what is described with respect to FIGS. 3-4.

Figure 5:
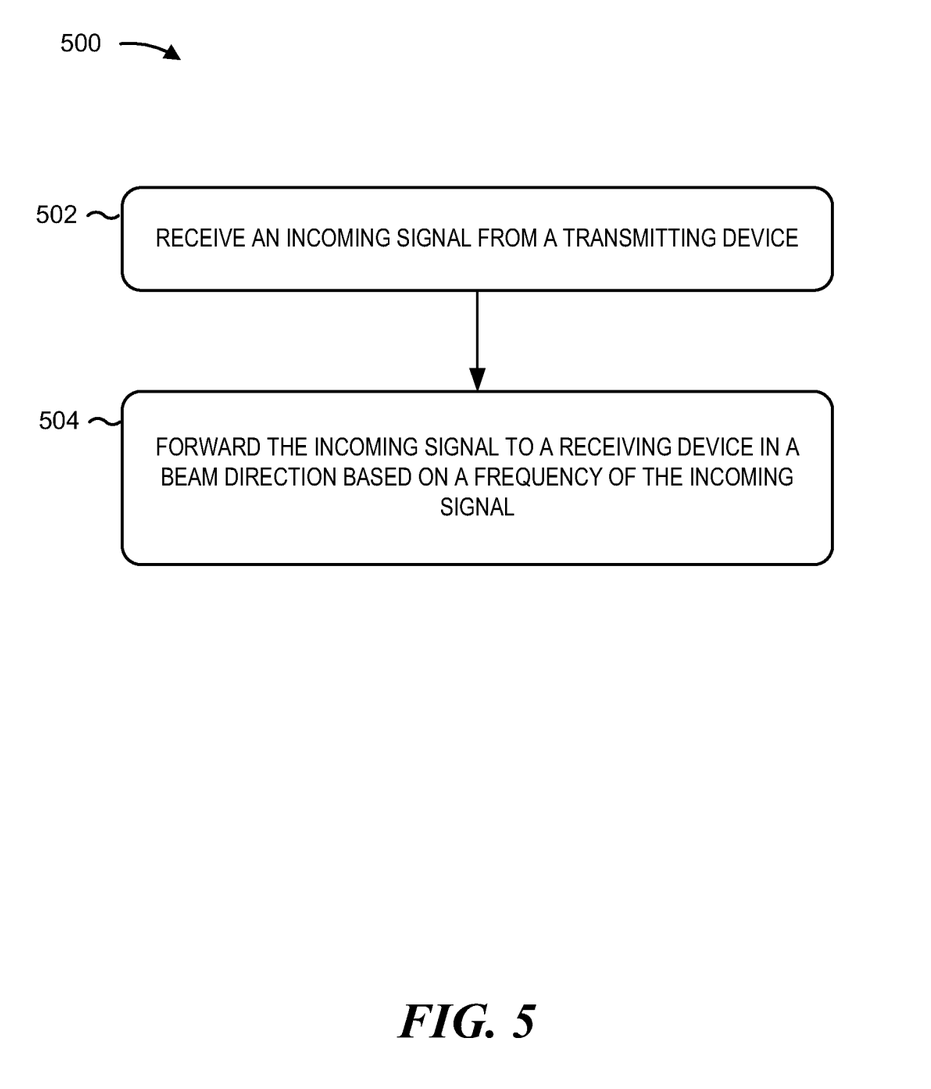
FIG. 5 is a flow diagram illustrating an example process performed, for example, by an assisting node, in accordance with various aspects of the present disclosure.

FIG. 5 is a flow diagram illustrating an example process 500 performed, for example, by an assisting node, in accordance with various aspects of the present disclosure. The example process 500 is an example of frequency domain beam sweeping by assisting nodes. The operations of the process 500 may be implemented by an assisting device 110d or a base station 110.

At block 502, the assisting device or base station receives an incoming signal from a transmitting device. For example, the assisting device or base station (e.g., using the antenna 234, demodulator 232, MIMO detector 236, receive processor 238, controller/processor 240, and/or memory 242) may receive the incoming signal. The incoming signal may be a wideband signal. The incoming signal may be a first incoming signal arriving from a first direction and a second incoming signal arriving from a second direction. In this case, the assisting device may reflect a first subband based on the first direction and reflect a second subband based on the second direction. The incoming signal may be received from different transmitters.

At block 504, the assisting device or base station forwards the incoming signal to a receiving device in a beam direction based on a frequency of the incoming signal. For example, the assisting device or base station (e.g., using the antenna 234, modulator 232, TX MIMO processor 230, transmit processor 220, controller/processor 240, and/or memory 242) may forward the incoming signal. In some aspects, the incoming signal is multiple frequency division multiplexed signals received from different directions. In these aspects, the forwarding includes forwarding to a single receiver point. In other aspects, the incoming signal is multiple frequency division multiplexed signals received from a single transmission point. In these aspects, the forwarding comprises forwarding each of the frequency division multiplexed signals in a different direction. In still other aspects, the incoming signal comprises multiple frequency division multiplexed signals received from different directions. In these aspects, the forwarding comprises forwarding each of the frequency division multiplexed signals in a different direction.

Figure 6:
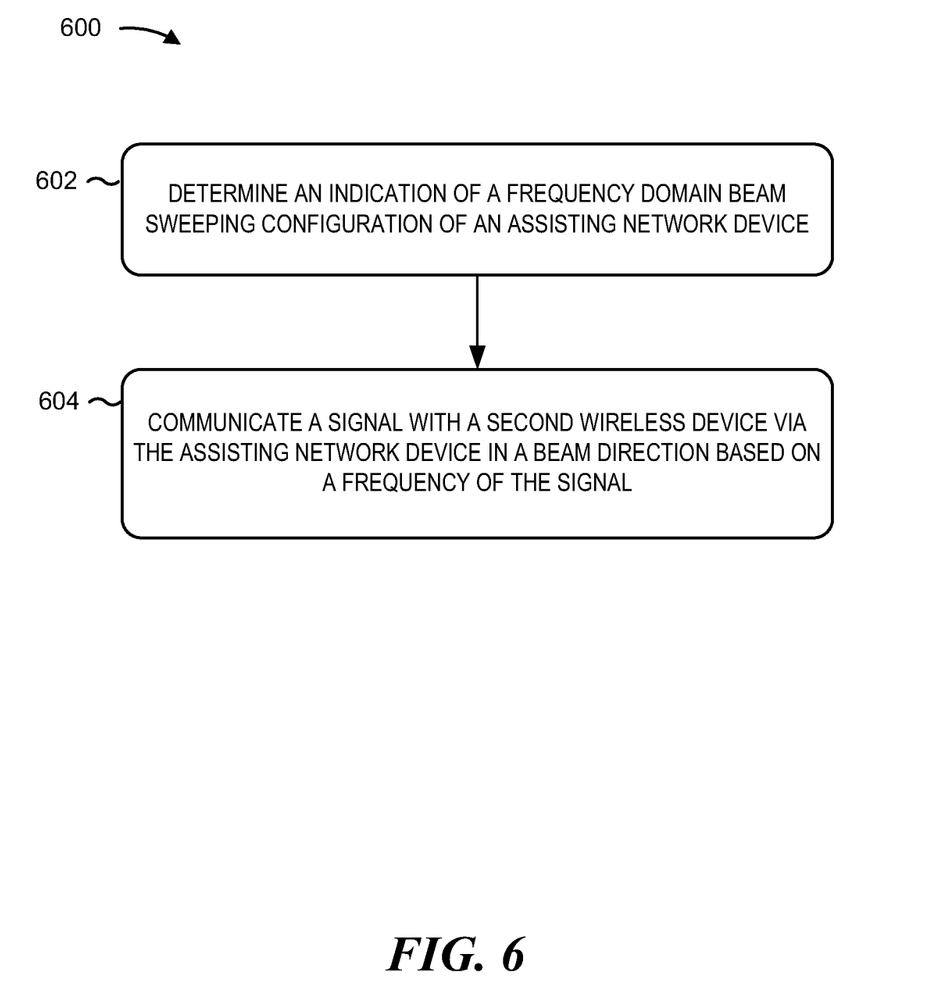
FIG. 6 is a flow diagram illustrating an example process performed, for example, by a first wireless device, in accordance with various aspects of the present disclosure.

FIG. 6 is a flow diagram illustrating an example process 600 performed, for example, by a first wireless device, in accordance with various aspects of the present disclosure. The example process 600 is an example of frequency domain beam sweeping by assisting nodes. The operations of the process 600 may be implemented by a user equipment (UE) 120 or base station 120.

At block 602, the device determines an indication of a frequency domain beam sweeping configuration of an assisting network device. For example, the device (e.g., using controller/processor 240, 280, and/or memory 242, 282) may determine the indication. The indication may be a fixed indication. In some aspects, the indication is received from a server or the assisting network device. In other aspects, the device detects the indications with reports received from other network devices.

At block 604, the device communicates a signal with a second wireless device via the assisting network device in a beam direction based on a frequency of the signal. For example, the device (e.g., using the antenna 234, 252, DEMOD/MOD 232, 254, TX MIMO processor 230, 266, MIMO detector 236, 256, transmit processor 220, 264, receive processor 238, 258, controller/processor 240, 280, and/or memory 242, 282) may communicate signal.

Figure 7:
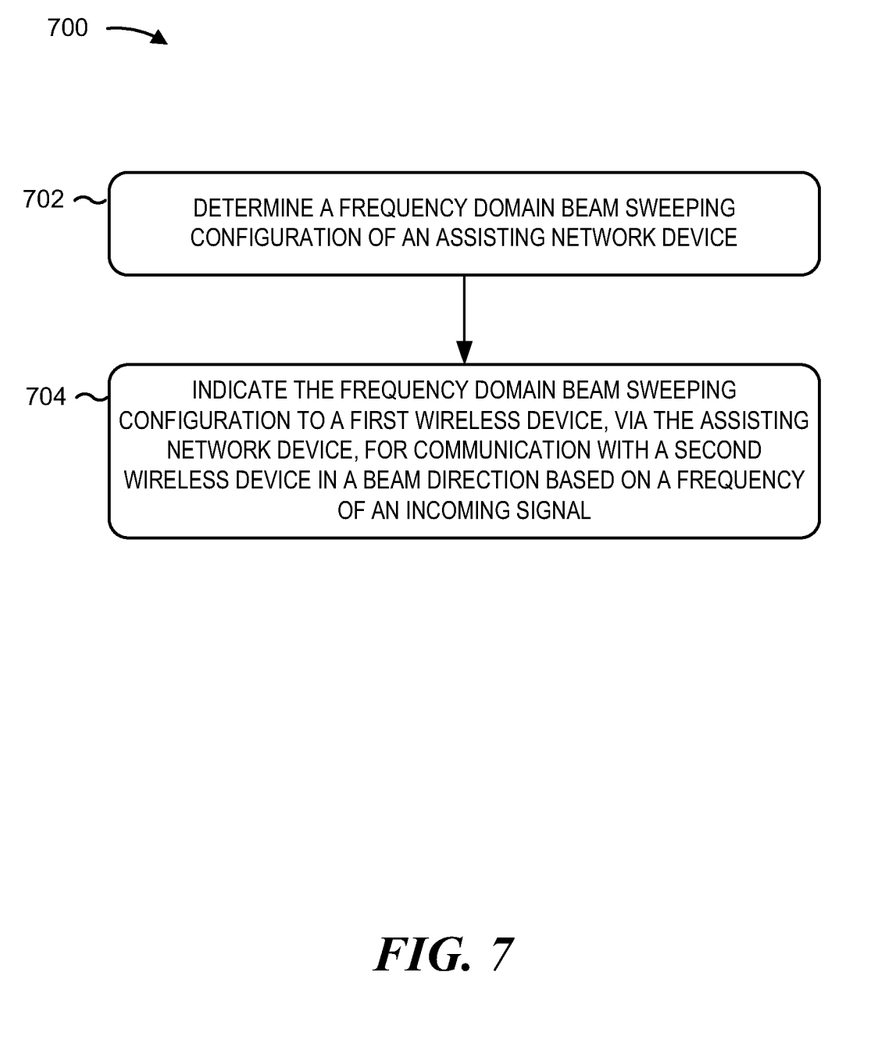
FIG. 7 is a flow diagram illustrating an example process performed, for example, by a controlling entity, in accordance with various aspects of the present disclosure.

FIG. 7 is a flow diagram illustrating an example process 700 performed, for example, by a controlling entity, in accordance with various aspects of the present disclosure. The example process 700 is an example of frequency domain beam sweeping by assisting nodes. The operations of the process 700 may be implemented by a base station 110 or core network 130.

At block 702, the controlling entity determines a frequency domain beam sweeping configuration of an assisting network device. For example, the controlling entity (e.g., using the controller/processor 240, 290, memory 242, 292, communication unit 294, transmit processor 220, TX MIMO processor 230, receive processor 238, MIMO detector 236, antenna 234 and/or DEMOD/MOD 232) may determine the configuration. In some aspects, the frequency domain sweeping configuration may be a fixed configuration. The controlling entity may determine the frequency domain sweeping configuration from reports received from other devices.

At block 704, the controlling entity indicates the frequency domain beam sweeping configuration to a first wireless device, via the assisting network device, for communication with a second wireless device in a beam direction based on a frequency of an incoming signal. For example, the controlling entity (e.g., using the controller/processor 240, 290, memory 242, 292, communication unit 294, transmit processor 220, TX MIMO processor 230, antenna 234 and/or DEMOD/MOD 232) may indicate the configuration. The frequency domain sweeping configuration may be dynamic or semi-static. The configuration may indicate frequency domain resources for a given direction. The configuration may indicate a direction for a given subband.

Implementation examples are described in the following numbered clauses.

1. A method of wireless communication by an assisting network device, comprising:
   receiving an incoming signal from a transmitting device; and
   forwarding the incoming signal to a receiving device in a beam direction based on a frequency of the incoming signal.
2. The method of clause 1, in which the assisting network device is a reflecting device and the forwarding comprises reflecting the incoming signal with a beam pattern based on the frequency of the incoming signal.
3. The method of clause 1 or 2, further comprising forwarding the incoming signal to the receiving device with a focus distance based on the frequency of the incoming signal
4. The method of any of the preceding clauses, in which the incoming signal comprises a wideband signal and the beam pattern includes different subbands of the incoming signal reflecting in different beam directions.
5. The method of any of the preceding clauses, in which the incoming signal comprises a first incoming signal arriving from a first direction and a second incoming signal arriving from a second direction, the reflecting device reflecting a first subband based on the first direction and reflecting a second subband based on the second direction.
6. The method of clause 1, in which the assisting network device is a repeater and the forwarding comprises repeating the incoming signal in a beam direction corresponding to the frequency of the incoming signal so that the incoming signal is repeated in a plurality of different beam directions, the incoming signal comprising a frequency division multiplexed signal.
7. The method of clause 1 or 6, further comprising indicating a fixed frequency domain beam sweeping configuration to a network device.
8. The method of any of the preceding clauses, further comprising receiving a frequency domain beam sweeping configuration from a network device.
9. The method of any of the preceding clauses, in which the incoming signal comprises a plurality of frequency division multiplexed signals received from a plurality of different directions, the forwarding comprising forwarding to a single receiver point.
10. The method of any of the preceding clauses, in which the incoming signal is received from a plurality of different transmitters.
11. The method of any of clauses 1-8, in which the incoming signal comprises a plurality of frequency division multiplexed signals received from a single transmission point, the forwarding comprising forwarding each of the plurality of frequency division multiplexed signals in a different direction.

12. The method of any of clauses 1-8, in which the incoming signal comprises a plurality of frequency division multiplexed signals received from a plurality of different directions, the forwarding comprising forwarding each of the plurality of frequency division multiplexed signals in a different direction.

13. A method of wireless communication by a first wireless device, comprising:
    determining an indication of a frequency domain beam sweeping configuration of an assisting network device; and
    communicating a signal with a second wireless device via the assisting network device in a beam direction based on a frequency of the signal.

14. The method of clause 13, in which the indication is received from the assisting network device and the frequency domain sweeping configuration is a fixed configuration.

15. The method of clause 13 or 14, in which the indication is received from a server via an internet protocol (IP) network and the frequency domain sweeping configuration is a fixed configuration.

16. The method of any of the clauses 13-15, further comprising detecting the indication with reports received from other network devices, and the frequency domain sweeping configuration is a fixed configuration.

17. The method of any of the clauses 13-16, further comprising sharing the indication with a third wireless device.

18. The method of any of the clauses 13-17, further comprising configuring the assisting network device with the frequency domain sweeping configuration, the indication comprising an acknowledgment.

19. The method of any of the clauses 13-18, further comprising configuring the assisting network device with the frequency domain sweeping configuration, which is dynamic or semi-static.

20. The method of any of the clauses 13-19, further comprising configuring the assisting network device with the frequency domain sweeping configuration, which indicates a range of directions and distances and associated frequency domain resources.

21. The method of any of the clauses 13-20, further comprising configuring the assisting network device with the frequency domain sweeping configuration, which comprises a reflecting pattern.

22. The method of any of the clauses 13-21, further comprising configuring the assisting network device with the frequency domain sweeping configuration, which indicates frequency domain resources for a given direction.

23. The method of any of the clauses 13-23, further comprising configuring the assisting network device with the frequency domain sweeping configuration, which indicates a direction for a given subband.

24. A method of wireless communication by a controlling entity, comprising:
    determining a frequency domain beam sweeping configuration of an assisting network device; and
    indicating the frequency domain beam sweeping configuration to a first wireless device, via the assisting network device, for communication with a second wireless device in a beam direction based on a frequency of an incoming signal.

25. The method of clause 24, in which the frequency domain sweeping configuration is a fixed configuration.

26. The method of clause 24 or 25, further comprising determining the frequency domain sweeping configuration with reports received from other network devices.

27. The method of any of the clauses 24-26, further comprising configuring the assisting network device with the frequency domain sweeping configuration.

28. The method of any of the clauses 24-27, in which the configuration is dynamic or semi-static.

29. The method of any of the clauses 24-28, in which the configuration indicates frequency domain resources for a given direction.

30. The method of any of the clauses 24-29, in which the configuration indicates a direction for a given subband.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by an assisting network device, comprising:
   receiving an incoming signal from a transmitting device; and
   forwarding the incoming signal to a receiving device with a focus distance based on a radio frequency of the incoming signal and in a beam direction that depends on the radio frequency of the incoming signal, such that the incoming signal on a first radio frequency transmits in a different direction than a second incoming signal on a second radio frequency.

2. The method of claim 1, in which the assisting network device is a reflecting device and the forwarding comprises reflecting the incoming signal with a beam pattern based on the radio frequency of the incoming signal.

3. The method of claim 2, in which the incoming signal comprises a wideband signal and the beam pattern includes different subbands of the incoming signal reflecting in different beam directions.

4. The method of claim 2, in which the incoming signal comprises a first incoming signal arriving from a first direction and a second incoming signal arriving from a second direction, the reflecting device reflecting a first subband based on the first direction and reflecting a second subband based on the second direction.

5. The method of claim 1, in which the assisting network device is a repeater and the forwarding comprises repeating the incoming signal in a beam direction corresponding to the radio frequency of the incoming signal so that the incoming signal is repeated in a plurality of different beam directions, the incoming signal comprising a frequency division multiplexed signal.

6. The method of claim 1, further comprising indicating a fixed frequency domain beam sweeping configuration to a network device.

7. The method of claim 1, further comprising receiving a frequency domain beam sweeping configuration from a network device.

8. The method of claim 1, in which the incoming signal comprises a plurality of frequency division multiplexed signals received from a plurality of different directions, the forwarding comprising forwarding to a single receiver point.

9. The method of claim 8, in which the incoming signal is received from a plurality of different transmitters.

10. The method of claim 1, in which the incoming signal comprises a plurality of frequency division multiplexed signals received from a single transmission point, the forwarding comprising forwarding each of the plurality of frequency division multiplexed signals in a different direction.

11. The method of claim 1, in which the incoming signal comprises a plurality of frequency division multiplexed signals received from a plurality of different directions, the forwarding comprising forwarding each of the plurality of frequency division multiplexed signals in a different direction.

12. A method of wireless communication by a first wireless device, comprising:
   determining an indication of a frequency domain beam sweeping configuration of an assisting network device; and
   communicating a signal with a second wireless device via the assisting network device in a beam direction that depends on a radio frequency of the signal, such that the signal on a first radio frequency transmits in a different direction than a second signal on a second radio frequency, in which a focus distance of a beam from the assisting network device is based on the radio frequency of the incoming signal.

13. The method of claim 12, in which the indication is received from the assisting network device and the frequency domain sweeping configuration is a fixed configuration.

14. The method of claim 12, in which the indication is received from a server via an internet protocol (IP) network and the frequency domain sweeping configuration is a fixed configuration.

15. The method of claim 12, further comprising detecting the indication with reports received from other network devices, and the frequency domain sweeping configuration is a fixed configuration.

16. The method of claim 15, further comprising sharing the indication with a third wireless device.

17. The method of claim 12, further comprising configuring the assisting network device with the frequency domain sweeping configuration, the indication comprising an acknowledgment.

18. The method of claim 12, further comprising configuring the assisting network device with the frequency domain sweeping configuration, which is dynamic or semi-static.

19. The method of claim 12, further comprising configuring the assisting network device with the frequency domain sweeping configuration, which indicates a range of directions and distances and associated frequency domain resources.

20. The method of claim 12, further comprising configuring the assisting network device with the frequency domain sweeping configuration, which comprises a reflecting pattern.

21. The method of claim 12, further comprising configuring the assisting network device with the frequency domain sweeping configuration, which indicates frequency domain resources for a given direction.

22. The method of claim 12, further comprising configuring the assisting network device with the frequency domain sweeping configuration, which indicates a direction for a given subband.

23. A method of wireless communication by a controlling entity, comprising:
   determining a frequency domain beam sweeping configuration of an assisting network device; and
   indicating the frequency domain beam sweeping configuration to a first wireless device, via the assisting network device, for communication with a second wireless device in a beam direction that depends on a radio frequency of an incoming signal, such that the signal on a first radio frequency transmits in a different direction than a second signal on a second radio frequency, in which a focus distance of a beam from the assisting network device is based on the radio frequency of the incoming signal.

24. The method of claim 23, in which the frequency domain sweeping configuration is a fixed configuration.

25. The method of claim 24, further comprising determining the frequency domain sweeping configuration with reports received from other network devices.

26. The method of claim 23, further comprising configuring the assisting network device with the frequency domain sweeping configuration.

27. The method of claim 26, in which the configuration is dynamic or semi-static.

28. The method of claim 26, in which the configuration indicates frequency domain resources for a given direction.

29. The method of claim 26, in which the configuration indicates a direction for a given subband.

* * * * *